United States Patent [19]

Iida et al.

[11] Patent Number: 5,338,715
[45] Date of Patent: Aug. 16, 1994

[54] CATALYST FOR EXHAUST GAS PURIFICATION

[75] Inventors: Kozo Iida; Shigeru Nojima, both of Hiroshima; Serizawa Satoru, Nagasaki; Norihisa Kobayashi, Tokyo, all of Japan

[73] Assignee: Mitsubishi Jukogyo Kabushiki Kaisha, Tokyo, Japan

[21] Appl. No.: 911,107

[22] Filed: Jul. 9, 1992

[30] Foreign Application Priority Data

| Jul. 9, 1991 | [JP] | Japan | 3-168008 |
| Aug. 1, 1991 | [JP] | Japan | 3-192829 |
| Dec. 3, 1991 | [JP] | Japan | 3-319195 |
| Dec. 26, 1991 | [JP] | Japan | 3-344273 |

[51] Int. Cl.$^5$ .................. B01J 29/28; B01J 29/30; B01J 29/36
[52] U.S. Cl. .................. 502/64; 502/65; 502/66; 502/71; 502/73; 502/74; 423/212; 423/213.2; 423/213.5
[58] Field of Search ............ 502/64, 66, 71, 74, 502/77, 65, 73; 423/212, 213.2, 213.5

[56] References Cited

U.S. PATENT DOCUMENTS

| 4,170,571 | 10/1979 | Ritscher | 423/718 |
| 4,229,424 | 10/1980 | Kokotailo | 423/718 |
| 5,164,350 | 11/1992 | Abe et al. | 502/66 |

FOREIGN PATENT DOCUMENTS

| 0434063 | 6/1991 | European Pat. Off. . |
| 0451291 | 10/1991 | European Pat. Off. . |
| WO91/06508 | 5/1991 | World Int. Prop. O. . |

*Primary Examiner*—Helene Klemanski
*Assistant Examiner*—David Sample
*Attorney, Agent, or Firm*—Jacobson, Price, Holman & Stern

[57] ABSTRACT

A catalyst for exhaust gas purification having a crystalline silicate including an oxide of an alkali metal and/or hydrogen ion, aluminum oxide, an oxide of an alkaline earth metal, Ca, Mg, Sr, or Ba, an X-ray diffraction pattern described in Table 1 in the specification, and containing at least one metal from the group consisting of the elements in Groups Ib and VIII of the periodic table, rare earth elements, titanium, vanadium, chromium, antimony, zinc, and manganese. With the use of a crystalline silicate containing alkaline earth elements together with other metals or with a composite structure of catalyst, the separation of aluminum or other metals from the crystal lattices (dealuminization or demetallization) can be controlled, and heat and steam resistance may be achieved.

4 Claims, No Drawings

CATALYST FOR EXHAUST GAS PURIFICATION

BACKGROUND OF THE INVENTION

1. Field of the Invention

The present invention relates to a catalyst for purifying exhaust gases that contain nitrogen oxides (NOx), carbon monoxide (CO), and hydrocarbons.

2. Description of the Related Art

For the purification treatment of exhaust gases from automobiles and other similar sources, catalysts (composition: Pt, Rh/$Al_2O_3$ system) known as three-way catalysts which utilize hydrocarbons and CO in the automotive emissions are usually used. The three-way catalysts are normally prepared by applying a $\gamma$-alumina slurry to a refractory carrier of cordierite or the like, baking, and then causing the carrier to support a metal, e.g., Pt, Rh, or Pd. They cannot remove NOx, hydrocarbons, and CO, however, unless the combustion occurs within a very narrow range close to the theoretical air-fuel ratio (e.g., A/F=14.6).

With growing concern over the global environments in recent years, there has been strong demand for fuel-efficient cars. Accordingly, lean-burn engines for combustion above the theoretical air-fuel ratio have arrested attention as a key technology. It is well-known that the fuel efficiency is improved by burning in the engine a fuel mixture of an increased air-fuel ratio (A/F).

However, this is accompanied by an increase in the oxygen concentration in the exhaust to such a level that while an ordinary three-way catalyst can remove hydrocarbons and CO, it does not remove NOx.

To purify the exhaust gas in the "lean-burn" region where the oxygen concentration is high, it has already been proposed to use catalysts consisting of a transition metal, such as Cu, supported by a zeolite of the general formula, $xM_{2/n}O.Al_2O_3.ySiO_2$, wherein M is an n-valent metal (see, e.g., Japanese Patent Provisional Publications Nos. 125250/1985 (60-125250) and 130735/1989 (1-130735)). Another catalyst has also been introduced to meet the end which comprises a crystalline silicate to which Cu is added, the silicate itself having a chemical composition, $(1\pm0.4)R_2O.[aM_2O_3.bAl_2O_3].ySiO_2$, in which R is an alkali metal ion and/or hydrogen ion, M is the ion of at least one element selected from the group consisting of Group VIII elements, rare earth elements, titanium, vanadium, chromium, niobium, and antimony, $a+b=1.0$, $a\leq0$, $b>0$, and $y>12$ (Japanese Patent Provisional Publication No. 303194/1989 (1-303194)).

While these recently introduced catalysts exhibit satisfactory initial activities, they have the disadvantage of limited durability.

Exhaust gases from ordinary lean-burn engines are at high temperatures over a broad range of 300° to 700° C., and conventional catalysts used for such engines have been found to deteriorate due to sintering of the supported active metal. Also, the present inventors have found that the catalytic deterioration of such conventional catalysts is accelerated by demetallization, a phenomenon in which aluminum and iron in the crystal lattices, which form ion exchange sites in the catalyst carrier zeolite and crystalline silicate, are removed from the crystal lattices under the influence of the high temperature exhaust gas atmosphere, especially in the presence of steam.

SUMMARY OF THE INVENTION

In view of the state of the art summarized above, an object of this invention is to provide a catalyst for purifying exhaust gases which is highly resistant to heat and steam and which does not have the drawbacks of conventional catalysts.

In order to develop a catalyst with great resistance to heat and steam, it is necessary to avoid the separation of aluminum or iron from the carrier, and it has been found that if aluminum remains stably in the crystal lattice, the degree of sintering of the active metal would be low under the exhaust gas conditions in the presence of high temperature steam.

The present inventors have also found that a catalyst which uses an alkaline earth metal-containing crystalline silicate as a catalyst carrier and which supports Cu or other similar metals on the carrier inhibits the metal from separating from the crystal lattices at elevated temperatures and in the presence of steam; that is, the demetallization can be controlled.

Thus the present inventors have developed a catalyst with excellent heat and steam resistance developed through the application of a crystalline silicate which incurs only a small possibility of dealuminization.

Furthermore, the present inventors have also discovered that by employing a composite structure of a crystalline silicate catalyst, the demetallization in high temperature steam atmosphere can be prevented, and have developed new types of catalysts for the purification of exhaust gases containing nitrogen oxides, hydrocarbons, and carbon monoxide.

A first aspect of this invention provides a catalyst for exhaust gas purification which comprises a crystalline silicate which in a dehydrated state has a chemical formula, in terms of the molar ratio of oxides,

$$aR_2O.bMO.Al_2O_3.cSiO_2,$$

wherein R is an alkali metal ion and/or hydrogen ion, M is an alkaline earth metal, Ca, Mg, Sr, or Ba, a =0-2, b=0.03-40, with the proviso that a+b>1, and c=11-3000 and which silicate has an X-ray diffraction pattern described in Table 1 hereinbelow, said crystalline silicate containing at least one metal chosen from Groups Ib and VIII of the periodic table.

In the above chemical formula it is specified that a is 0 to 2 and a+b is more than one. This is because the components in these ranges permit the synthesis of the crystalline silicate as formulated. Also, the specified range of b being 0.03 to 40 is where the alkaline earth metal can function effectively. The further limitation of c being 11 to 3000 is based on the fact that if c is less than 11 the synthesis of the crystalline silicate is impossible and if c is more than 3000 the resulting catalyst according to the invention does not have adequate exhaust purification activity.

Thus, the catalyst of the first aspect of the invention for exhaust gas purification is characterized by the use of a silicate containing an alkaline earth metal as a crystalline silicate which incurs only a limited possibility of removal of aluminum from the carrier. This silicate is produced through crystallization by hydrothermal synthesis, with the presence of an alkaline earth metal in the starting material mixture.

TABLE 1

| Lattice spacing (d value) | Relative intensity |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

VS: Very Strong
S: Strong
M: Moderate
W: Weak

For the synthesis of the crystalline silicate that contains an alkaline earth metal, the silica source to be used is water glass, silica sol, silica gel or the like. The alumina source to be chosen is aluminum nitrate, aluminum sulfate, sodium aluminate or the like. The alkali metal ion is, e.g., sodium oxide in water glass, sodium aluminate, sodium hydroxide. For alkaline earth metal ions, their acetates, nitrates, and chlorides may be used. As an alkaline earth metal calcium (Ca), magnesium (Mg), strontium (St), or barium (Ba) can be used. Further, as a crystallizing mineralizer tetrapropylammonium bromide or the like is used.

The reaction mixture for the hydrothermal synthesis of the alkaline earth metal-containing crystalline silicate is made up with the following mixing ratios: $SiO_2/Al_2O_3 = 11$ to 3000 (molar ratio); $OH^-/SiO_2 = 0.01$ to 10; $H_2O/SiO_2 = 1$ to 1000; tetrapropylammonium compound/$SiO_2 = 0$ to 4; alkaline earth metal/Al (atomic ratio) = 0.03 to 40.

The crystalline silicate can be synthesized by heating the above mixture at 80° to 200° C. for about 1 to 200 hours with stirring, removing excess ions by water rinsing, drying, and then baking.

The catalyst according to the first aspect of the invention is prepared by allowing the alkaline earth metal-containing crystalline silicate to support at least one metal in Groups Ib and VIII, e.g., copper or cobalt, either by way of ion exchange with the immersion of the silicate in an aqueous solution of such a metal or by impregnating the silicate with an aqueous solution of a salt of the metal, such as chloride or nitrate.

Although the catalyst made in accordance with the invention is desired to have a honeycomb shape that permits the reduction of pressure loss, it may be pelletized instead. Such binder as silica sol or alumina sol in use for the molding of the catalyst has already been confirmed to have little adverse effect upon the catalyst performance.

The catalyst of this first aspect for exhaust gas purification is adequately durable in automotive exhaust purification and other similar services with only little deterioration of activity in the presence of steam at 600° C. and even higher temperatures.

The outstanding durability of the catalyst according to the first aspect of the invention is attributable to the use of an alkaline earth-containing silicate as a carrier. The alkaline earth contained in the silicate functions to decrease the number of strongly acidic points in the silicate which would otherwise accelerate the dealuminization. On the other hand, it causes little change in the catalytic activities for NO adsorption and the activation of hydrocarbons. Since the dealuminization is thus avoided, the Group Ib or VIII metal or metals that are active can be stably supported by the silicate carrier.

A second aspect of this invention provides a catalyst for exhaust gas purification, comprising a crystalline silicate which in a dehydrated state has a chemical formula, $$(1 \pm 0.4)R_2O \cdot [aM_2O_3 \cdot bAl_2O_3] \cdot cMeO \cdot ySiO_2,$$

wherein R is an alkali metal ion and/or hydrogen ion, M is at least one element selected from the group consisting of Group VIII elements, rare earth elements, titanium, vanadium, chromium, niobium, and antimony, Me is an alkaline earth element, $a+b=1.0$, $a>0$, $b>0$, $y/c>12$, and $y>12$, said crystalline silicate containing at least one metal selected from Zn, Mn, Cr, and the elements in Groups Ib and VIII of the periodic table.

The alkaline earth metal-containing crystalline silicate is prepared by mixing sources of silica, alkaline earth metal, alkali metal, transition metal, and aluminum with water and a quaternary alkylammonium salt such as tetrapropylammonium bromide, or an alcohol amine, alkylamine or the like, and then holding this reaction mixture for a period and at a temperature adequate for forming a crystalline silicate.

The silica source to be used may be water glass, silica sol, silica gel or the like. The alkaline earth metal source may be an acetate, nitrate, chloride, or the like of Ca, Mg, St, or Ba.

The alkali metal is, e.g., sodium in water glass, sodium hydroxide, or potassium hydroxide. The aluminum source may be sodium aluminate, aluminum nitrate, aluminum sulfate, or the like. Transition metal sources include the Group VIII elements, such as Fe, Ni, Co, Rh, Ru, and Pd, rare earth elements, such as La and Ce, as well as Ti, V, Cr, Nb, and Sb. Such a source of transition metals may be used in the form of, e.g., a sulfate, nitrate, or chloride as a starting material.

The catalyst is prepared by adding the chloride or nitrate of Cu, Co, Ni, Zn, Fe, Cr, or Mn to the alkaline earth metal-containing crystalline silicate either through impregnation or ion exchange with an aqueous solution of their salt.

The catalyst according to the second aspect of the invention is characterized in that it is prepared by allowing an alkaline earth metal to be present in the reaction mixture at the time of crystalline silicate synthesis. Presumably, the alkaline earth metal incorporated and stabilized in the lattice of the silicate crystal in this way helps improve the catalyst durability.

A third aspect of this invention provides a catalyst for exhaust gas purification comprising a composite crystalline silicate having an X-ray diffraction pattern described in Table 1 above, the composite crystalline silicate being formed by growing a crystalline silicate made from Si and O over a mother crystal of a crystalline silicate synthesized in advance, the mother crystal being represented, in a dehydrated state and in terms of the molar ratio of oxides, by the following chemical formula:

$$(1 \pm 0.6)R_2O \cdot [aM_2O_3 \cdot bAl_2O_3] \cdot ySiO_2,$$

wherein R is an alkali metal ion and/or hydrogen ion, M is an ion of at least one element selected from the group consisting of Group VIII elements, rare earth elements, titanium, vanadium, chromium, niobium, antimony, and gallium, $a \geqq 0$, $b \geqq 0$, $a+b=1$, and $y>12$, said mother crystal having an X-ray diffraction pattern described in Table 1 above, the crystalline silicate grown over the mother crystal having the same crystalline structure as the mother crystal, and the composite crystalline silicate containing at least one metal chosen from Groups Ib and VIII of the periodic table.

The mother crystal to be used in the third aspect of the present invention is synthesized under the following conditions:

$SiO_2/(M_2O_3+Al_2O_3)$: 12–3000 (preferably 20–200)
$OH^-/SiO_2$: 0–1.0 (preferably 0.2–0.8)
$H_2O/SiO_2$: 2–1000 (preferably 10–200)
Organonitrogen compound/$(M_2O_3+Al_2O_3)$: 0–200 (preferably 0–50)

M signifies one or more elements chosen from Group VIII elements, rare earth elements, titanium, vanadium, chromium, niobium, antimony, and gallium, and the organonitrogen compound when used may be tetrapropylammonium bromide or the like.

The crystalline silicate used as the mother crystal can be synthesized by heating a mixture of the above materials at a temperature and for a time period sufficient for producing a crystalline silicate. The temperature for hydrothermal synthesis is in the range of 80° to 300° C., preferably 130° to 200° C., and the hydrothermal synthesis may be carried out for 0.5 to 14 days, preferably 1 to 10 days. The pressure is not specifically limited, but desirably the synthesis is carried out under the mixture's own pressure.

The hydrothermal synthesis reaction is effected by heating the material mixture to a desired temperature and, with stirring where necessary, continued until a crystalline silicate forms. Following the crystallization, the reaction mixture is cooled down to room temperature, filtered, rinsed with water, and separated. Usually, the product is further dried at 100° C. or above for about 5 to 24 hours.

The term "composite crystalline silicate" as used herein means a composite crystalline silicate of a structure formed by first synthesizing a crystalline silicate in the aforesaid manner as a mother crystal and then allowing a crystalline silicate (to be called "silicalite" hereinafter) which comprises Si and O and has the same structure as the mother crystal to grow thereon.

The crystalline silicate serving as the mother crystal is desirably one which is represented, in a dehydrated state and in terms of the molar ratio of oxides, by the following chemical formula:

$(1\pm0.6)R_2O.[aM_2O_3.bAl_2O_3].ySiO_2$, wherein R is an alkali metal ion and/or hydrogen ion, M is an ion of at least one element selected from the group consisting of Group VIII elements, rare earth elements, titanium, vanadium, chromium, niobium, antimony, and gallium, $a \geqq 0$, $b \geqq 0$, $a+b=1$, and $y>12$, said crystalline silicate having an X-ray diffraction pattern shown in Table 1 above.

One method for the crystal growth of silicalite on the outer surface of the crystalline silicate serving as the mother crystal is hydrothermal synthesis.

For the crystal growth of silicalite on the outer surface of the mother crystal by hydrothermal synthesis, water glass, silica sol or the like is employed as a silica source. The alkali metal ion to be used is, e.g., sodium oxide or sodium hydroxide in water glass, and the crystallizing mineralizer is, e.g., tetrapropylammonium bromide.

The proportion of the silicalite to be grown as crystal with respect to the mother crystal crystalline silicate is desirably, in terms of the silicalite/mother crystal weight ratio, from 0.01 to 100 for the synthesis. Also, as a prerequisite for the crystal growth of silicalite on the mother crystal, the mixing ratios of the materials should be: $OH^-/SiO_2=0.01$ to 10, $H_2O/SiO_2=1$ to 1000, and organic matter (e.g., tetrapropylammonium compound)/$SiO_2=0$ to 10.

The synthesis procedure consists of adding finely powdered mother crystals to the above mixture, stirring the whole mixture homogeneously, heating it with stirring at 80 to 200° C. for 1 to 200 hours, removing excess ions by water rinsing, drying, and baking. In this way a composite crystalline silicate according to the third aspect of the present invention is obtained.

The catalyst is prepared by immersing the composite crystalline silicate in an aqueous solution of a salt of a Group Ib or VIII metal, e.g., copper or cobalt, and allowing the silicate to support the metal ion by ion exchange or by impregnation with an aqueous solution of a metal salt, such as chloride or nitrate.

In the third aspect of the invention, the use of a silicalite-covered composite crystalline silicate improves the durability of the resulting catalyst for the following reason. In exhaust emissions present are such gases as NO, CO, hydrocarbons, $H_2O$ (steam), and $O_2$. The exhaust is purified at the active reaction sites of the catalyst while, at the same time, the presence of high temperature $H_2O$ tends to cause metals to separate from the silicate (demetallization). However, the coating of silicalite, which is hydrophobic by nature, makes it difficult for $H_2O$ alone to permeate deep into the crystalline silicate. As a consequence, the $H_2O$ concentrations become low around the active reaction sites in the catalyst, and the demetallization is inhibited.

A fourth aspect of this invention provides a catalyst for exhaust gas purification comprising a composite crystalline silicate having an X-ray diffraction pattern shown in Table 1 above, the composite crystalline silicate being formed by growing a crystalline silicate made from Si and 0 over a mother crystal of a crystalline silicate synthesized in advance, said mother crystal is represented, in a dehydrated state and in terms of the molar ratio of oxides, by the following chemical formula:

$(1\pm0.6)R_2O.[aM_2O_3.bAl_2O_3].cMeO.ySiO_2$, wherein R is an alkali metal ion and/or hydrogen ion, M is at least one element selected from the group consisting of Group VIII elements, rare earth elements, titanium, vanadium, chromium, niobium, antimony, and gallium, Me is an alkaline earth element, $a \geqq 0$, $b \geqq 0$, $c \geqq 0$, $a+b=1$, $y/c>12$, and $y>12$, the mother crystal having an X-ray diffraction pattern shown in Table 1 above, the crystalline silicate grown over the mother crystal having the same crystalline structure as the mother crystal, and the composite crystalline silicate containing at least one metal chosen from Groups Ib and VIII of the periodic table.

The mother crystal to be used in the present invention can be synthesized under the following conditions:

$SiO_2/(M_2O_3+Al_2O_3)$: 12–3000 (preferably 20–200)
$SiO_2/MeO$: 12–∞ (preferably 20–10000)

$OH^-/SiO_2$: 0–10

$H_2O/SiO_2$: 2–1000 (preferably 10–200)

Organonitrogen compound/$(M_2O_3+Al_2O_3)$: 0–1000 (preferably 0–50)

M is at least one element selected from the group consisting of Group VIII elements, rare earth elements, titanium, vanadium, chromium, niobium, antimony, and gallium, Me is an alkaline earth metal, and the organonitrogen compound when used may be tetrapropylammonium bromide or the like.

The crystalline silicate used as the mother crystal is synthesized by heating a mixture of the above materials at a temperature and for a time period sufficient for producing a crystalline silicate. The temperature for hydrothermal synthesis is in the range of 80° to 300° C., preferably 130° to 200° C., and the hydrothermal synthesis is carried out for 0.5 to 14 days, preferably 1 to 10 days. The pressure is not specifically limited, but desirably the synthesis is carried out under the mixture's own pressure.

The hydrothermal synthesis reaction is effected by heating the material mixture to a desired temperature and, with stirring where necessary, kept on until a crystalline silicate forms. Following the crystallization, the reaction mixture is cooled down to room temperature, filtered, rinsed with water, and separated. Usually, the product is further dried at 100° C. or above for about 5 to 24 hours.

The term "composite crystalline silicate" as used herein means a composite crystalline silicate of a structure formed by first synthesizing a crystalline silicate in the aforesaid manner as a mother crystal and then allowing a crystalline silicate (to be called "silicalite" hereinafter) which comprises Si and O and has the same structure as the mother crystal to grow thereon.

The crystalline silicate serving as the mother crystal is desirably one which is represented, in a dehydrated state and in terms of the molar ratio of oxides, by the following chemical formula:

$(1\pm0.6)R_2O.[aM_2O_3.bAl_2O_3].cMeO.ySiO_2,$ wherein R is an alkali metal ion and/or hydrogen ion, M is the ion of at least one element selected from the group consisting of Group VIII elements, rare earth elements, titanium, vanadium, chromium, niobium, antimony, and gallium, Me is an alkaline earth element, $a \geq 0$, $b \geq 0$, $c \geq 0$, $a+b=1$, $y/c>12$, and $y>12$, said crystalline silicate having an X-ray diffraction pattern shown in Table 1 above.

One method for the crystal growth of silicalite on the outer surface of the crystalline silicate serving as the mother crystal is hydrothermal synthesis. For the crystal growth of silicalite on the outer surface of the mother crystal by hydrothermal synthesis, water glass, silica sol or the like is employed as a silica source. The alkali metal ion to be used is, e.g., sodium oxide or sodium hydroxide in water glass, and the crystallizing mineralizer is, e.g., tetrapropylammonium bromide.

The proportion of the silicalite to be grown as crystal with respect to the crystalline silicate as the mother crystal is desirably, in terms of the silicalite/mother crystal weight ratio, from 0.01 to 100 for the synthesis. Also, as a prerequisite for the crystal growth of silicalite on the mother crystal, the mixing ratios of the materials should be: $OH^-/SiO_2=0.01$ to 10, $H_2O/SiO_2=1$ to 1000, and organic matter (e.g., tetrapropylammonium compound)/$SiO_2=0$ to 10.

The synthesis procedure consists of adding finely powdered mother crystals to the above mixture, stirring the whole mixture homogeneously, heating it with stirring at 80 to 200° C. for 1 to 200 hours, removing excess ions by water rinsing, drying, and baking. In this way a composite crystalline silicate according to the present invention is obtained.

The catalyst is prepared by immersing the composite crystalline silicate in an aqueous solution of a salt of a Group Ib or VIII metal, e.g., copper or cobalt, and allowing the silicate to support the metal ion by ion exchange or by impregnation with an aqueous solution of a metal salt, such as chloride or nitrate.

The use of a silicalite-covered composite crystalline silicate improves the durability of the resulting catalyst for the following reason. In exhaust emissions are present such gases as NO, CO, hydrocarbons, $H_2O$ (steam), and $O_2$. The exhaust is purified at the active reaction sites of the catalyst while, at the same time, the presence of high temperature $H_2O$ tends to cause metals to separate from the silicate (demetallization). However, the coating of silicalite, which is hydrophobic by nature, makes it difficult for $H_2O$ alone to permeate deep into the crystalline silicate. As a consequence, the $H_2O$ concentrations around the active reaction sites in the catalyst are low and the demetallization is inhibited.

Moreover, in the catalyst according to the fourth aspect of the invention, the alkaline earth element contained in the mother crystal weakens the strongly acidic sites in the silicate which would otherwise promote the removal of metal from the resulting catalyst and thereby inhibits the demetallization in the presence of high-temperature steam.

As discussed in connection with the first to fourth aspects above, the catalyst for exhaust gas purification in accordance with the invention is highly durable and stable. It is useful as a catalyst for purifying exhaust gases from lean-burn gasoline engines and diesel engines of motor vehicles.

In the following the present invention will be described in further detail with reference to a number of embodiments for this invention and comparative examples for conventional catalyst.

DETAILED DESCRIPTION OF THE PREFERRED EMBODIMENTS

The first aspect of the invention will now be described in detail by way of Examples 1 to 3 and Comparative Example 1.

EXAMPLE 1

Catalysts for describing the first aspect of this invention were prepared in the following way.

Synthesis of alkaline earth metal-containing silicate 1A

A solution prepared by dissolving 395.5 g of aluminum nitrate and 94.4 g of calcium acetate in 6552 g of water was designated solution 1A. Solution 1B was prepared by dissolving 4212 g of water glass sold as "Cataloid SI-30" (a product of Catalysts & Chemicals Industries Co., Japan, contg. 30.5% $SiO_2$ and 0.42% $Na_2O$) in 2808 g of water. Solution 1B was added to solution 1A with vigorous stirring. Next, a solution of 234 g sodium hydroxide in 1404 g water and then a solution of 568.6 g tetrapropylammonium bromide (TPABr) in 2106 g water were added. Stirring was continued for about 10 minutes, and an aqueous gel mixture resulted. The molar ratios of the components were: $SiO_2/Al_2O_3=40$ and $SiO_2/CaO=40$.

This aqueous gel mixture was charged into an autoclave having a capacity of 20 liters and hydrothermally treated at the charge's own pressure and at 160° C. for 72 hours with stirring (at 200 rpm). Following the treatment, the reaction product was centrifuged for solid-liquid separation. The solid matter was thoroughly washed with water and dried at 120° C. for 5 hours in the air. It was then baked at 500° C. for 5 hours. The Ca-containing crystalline silicate thus obtained is herein referred to as silicate 1A.

Synthesis of alkaline earth metal-containing silicates 1B-1N

The procedure described above for the synthesis of the alkaline earth metal-containing silicate 1A was repeated except for changes in the alkaline earth salts used as an ingredient and in compositional formulation to obtain various alkaline earth metal-containing silicates 1B to 1N. The proportions of ingredients are listed in Table 2 below.

Preparation of catalysts

Alkaline earth metal-containing silicates 1A to 1N were subjected to copper ion exchange by immersion in a 0.04M aqueous copper acetate with stirring, and after 24-hour stirring at room temperature they were rinsed. This cycle of copper ion exchange was repeated three times each with a fresh supply of the solution. Final rinsing and drying gave powder catalysts 1a to 1n.

To 100 parts of each of the powder catalysts added as binders were 3 parts of alumina sol, 55 parts of silica sol, and 230 parts of water. The mixtures upon thorough stirring afforded slurries for wash coating.

Divided portions of cordierite type monolithic substrates (with a 400-cell lattice pattern) were separately dipped in the slurries and taken out, excess slurries were blown away, and then dried at 200° C. The coating weighed 200 g per liter of the substrate. The coated substrates are designated as honeycomb catalysts 1A to 1N.

These powder catalysts were supported by monolithic substrates in the manner described in Example 1, and honeycomb catalysts 1O to 1S were obtained.

EXAMPLE 3

Silicate 1A prepared in Example 1, with the addition of a binder, was applied to a cordierite type monolithic substrate to form a coating. Divided portions of the coated monolithic substrate were separately immersed for impregnation over a one-hour period in a solution of cuprous chloride in hydrochloric acid (26.8 g in 200 cm$^3$ of HCl), aqueous cupric chloride solution (46.1 g in 200 cm$^3$ of water), aqueous cobalt chloride (64.4 g in 200 cm$^3$ of water), aqueous nickel chloride (64.4 g in 200 cm$^3$ of water), aqueous solution mixture of cupric chloride and cobalt chloride (23.1 g of $CuCl_2.2H_2O$ and 32.2 g of $CoCl_2.6H_2O$ in 200 cm$^3$ of water), and aqueous solution mixture of nickel chloride and cobalt chloride (32.2 g of $NiCl_2.2H_2O$ and 32.2 g of $CoCl_2.6H_2O$ in 200 cm$^3$ of water), respectively. The solutions left on the walls of the substrates were wiped off, and the coated substrates were dried at 200° C. A 12-hour purging in a nitrogen atmosphere at 500° C. yielded honeycomb catalysts 1T to 1Y.

COMPARATIVE EXAMPLE 1

Two types of crystalline silicates were synthesized by the same method as described in Example 1 with the exception that no alkaline earth metal was added. The material proportions of these silicates, designated as 1O and 1P, are also given in Table 2.

These silicates 1O and 1P were subjected to Cu ion exchange in the same manner as for the catalyst preparation in Example 1 to obtain powder catalysts 1t and 1u. Likewise monolithic substrates were coated with them to give honeycomb catalysts 1Z and 1ZA. The details of thus obtained honeycomb catalysts 1A to 1ZA are summarized in Table 3.

EXPERIMENT 1

TABLE 2

| Silicate No. | "Cataloid" SI-30 (g) | Al(NH$_3$)$_2$.9H$_2$O (g) | NaOH (g) | TPABr (g) | Alkaline earch metal salt Type | (g) | Charge composition SiO$_2$/Al$_2$O$_3$ | SiO$_2$/MO | Conditions for hydrothermal synthesis |
|---|---|---|---|---|---|---|---|---|---|
| 1A | 4212 | 395.5 | 234 | 568.6 | Ca(CH$_3$COO)$_2$.H$_2$O | 94.4 | 40 | M:Ca 40 | 160° C. × 72 hr |
| 1B | " | " | " | " | Mg(CH$_3$COO)$_2$.4H$_2$O | 114.7 | 40 | M:Mg 40 | " |
| 1C | " | " | " | " | Sr(CH$_3$COO)$_2$.½H$_2$O | 113.0 | 40 | M:Sr 40 | " |
| 1D | " | " | " | " | Ba(CH$_3$COO)$_2$.H$_2$O | 143.5 | 40 | M:Ba 40 | " |
| 1E | " | " | " | " | Ca(CH$_3$COO)$_2$.H$_2$O | 47.2 | 40 | M:Ca 80 | " |
| 1F | " | " | " | " | Ca(CH$_3$COO)$_2$.H$_2$O | 188.8 | 40 | M:Ca 20 | " |
| 1G | " | " | " | " | Ca(NO$_3$)$_2$.4H$_2$O | 126.5 | 40 | M:Ca 40 | " |
| 1H | " | " | " | " | Ba(NO$_3$)$_2$. | 104.6 | 40 | M:Ba 40 | " |
| 1I | " | " | " | 94.6 | Ca(CH$_3$COO)$_2$.H$_2$O | 94.4 | 40 | M:Ca 40 | " |
| 1J | " | 197.8 | " | 568.6 | Ca(CH$_2$COO)$_2$.H$_2$O | 94.4 | 80 | M:Ca 40 | " |
| 1K | " | " | " | " | CaCl$_2$.2H$_2$O | 78.8 | 80 | M:Ca 40 | " |
| 1L | " | " | " | " | Sr(CH$_3$COO)$_2$.½H$_2$O | 113.0 | 80 | M:Sr 40 | " |
| 1M | " | " | " | " | Ba(CH$_3$COO)$_2$.H$_2$O | 143.5 | 80 | M:Ba 40 | " |
| 1N | " | " | " | " | Mg(CH$_3$COO)$_2$.4H$_2$O | 114.7 | 80 | M:Mg 40 | " |
| 1O | 4212 | 395.5 | 234 | 568.6 | — | | 40 | — | 160° C. × 72 hr |
| 1P | " | 197.8 | " | " | — | | 80 | — | " |

EXAMPLE 2

Divided portions of silicate 1A obtained in Example 1 were immersed with agitation in 0.04M aqueous solutions of cuptic chloride, cobalt chloride, nickel chloride, ferric chloride, and silver nitrate, and in the same way as described in Example 1, powder catalysts 1O to 1S were prepared.

Honeycomb catalysts 1A to 1ZA prepared in Examples 1 to 3 and in Comparative Example 1 were tested for the evaluation of their activities. The conditions for activity evaluation were as follows.

Gas composition

NO=400 ppm; CO=1000 ppm; $C_2H_4$=1000 ppm; $C_3H_6$=340 ppm; $O_2$=8%; $CO_2$=10%; $H_2O$=10%; the remainder=$N_2$; GHSV=30000 hr$^{-1}$; catalyst shape=15 mm×15 mm×60 mm (144 cells); reaction temperature=350° C.

The denitration rates of the catalysts in the initial state at 450° C. are given in Table 4.

EXPERIMENT 2

As a durability test the catalysts were forced to deteriorate with the supply of a gaseous mixture consisting of 10% $H_2O$ and the balance $N_2$ gas at a GHSV of 30000 $hr^{-1}$ for 24 hours.

The forcibly deteriorated honeycomb catalysts 1A to 1ZA were evaluated for their activities under the same conditions as used in Experiment 1. The results are also shown in Table 4.

As Table 4 indicates, honeycomb catalysts 1A to 1Y prepared using alkaline earth metal-containing silicates had high denitration activities after the forced deterioration as well as in the initial state, proving that they were durable.

Table 4 also indicates that the ordinary silicate catalysts (honeycomb catalysts 1Z and 1ZA) showed substantial reductions in activity after the forced deterioration, revealing that they were less durable.

As for the purification activity against CO and hydrocarbons, honeycomb catalysts 1A to 1Y according to the first aspect of the invention showed little changes in activity from the initial stage till after the forced deterioration. They all achieved 100% removal of those pollutants at both 350° C. and 450° C. Comparative honeycomb catalysts 1Z and 1ZA also exhibited initial activities of 100% CO and hydrocarbon removal at the two temperature levels. After the forced deterioration, however, honeycomb catalyst 1Z showed much lower CO removal rates at 350° C. and 450° C. of 15% and 60%, respectively. Its hydrocarbon removal rates at the two temperature levels dropped to 45% and 80%. At 350° C. and 450° C, honeycomb catalyst 1ZA too showed reduced CO removal rates of 10% and 50% and hydrocarbon removal rates of 35% and 70%, respectively.

The second aspect of the invention will now be described in more detail by way of Example 4 and Comparative Example 2.

TABLE 3

| Honeycomb catalyst No. | Powder catalyst No. | Qty of active substance supported (mmol per gram of silicate) | Type of silicate No. | $SiO_2/Al_2O_3$ | $SiO_2/MO$ |
| --- | --- | --- | --- | --- | --- |
| 1A | 1a | Cu (0.55) | 1A | 40 | M:Ca 40 |
| 1B | 1b | Cu (0.5) | 1B | 40 | M:Mg 40 |
| 1C | 1c | Cu (0.55) | 1C | 40 | M:Sr 40 |
| 1D | 1d | Cu (0.5) | 1D | 40 | M:Ba 40 |
| 1E | 1e | Cu (0.5) | 1E | 40 | M:Ca 80 |
| 1F | 1f | Cu (0.45) | 1F | 40 | M:Ca 20 |
| 1G | 1g | Cu (0.4) | 1G | 40 | M:Ca 40 |
| 1H | 1h | Cu (0.45) | 1H | 40 | M:Ba 40 |
| 1I | 1i | Cu (0.5) | 1I | 40 | M:Ca 40 |
| 1J | 1j | Cu (0.4) | 1J | 80 | M:Ca 40 |
| 1K | 1k | Cu (0.35) | 1K | 80 | M:Ca 40 |
| 1L | 1l | Cu (0.45) | 1L | 80 | M:Sr 40 |
| 1M | 1m | Cu (0.4) | 1M | 80 | M:Ba 40 |
| 1N | 1n | Cu (0.35) | 1N | 80 | M:Mg 40 |
| 1O | 1o | Cu (0.55) | 1A | 40 | M:Ca 40 |
| 1P | 1p | Co (0.5) | 1A | 40 | M:Ca 40 |
| 1Q | 1q | Ni (0.55) | 1A | 40 | M:Ca 40 |
| 1R | 1r | Fe (0.35) | 1A | 40 | M:Ca 40 |
| 1S | 1s | Ag (0.8) | 1A | 40 | M:Ca 40 |
| 1T | — | Cu (0.8) | 1A | 40 | M:Ca 40 |
| 1U | — | Cu (0.8) | 1A | 40 | M:Ca 40 |
| 1V | — | Co (0.8) | 1A | 40 | M:Ca 40 |
| 1W | — | Ni (0.8) | 1A | 40 | M:Ca 40 |
| 1X | — | Cu(0.4)Co(0.4) | 1A | 40 | M:Ca 40 |
| 1Y | — | Ni(0.4)Co(0.4) | 1a | 40 | M:Ca 40 |
| 1Z | 1t | Cu (0.6) | 1O | 40 | — |
| 1ZA | 1u | Cu (0.4) | 1P | 40 | — |

TABLE 4

| Honeycomb Catalyst No. | Initial activity ($\eta$NOx %) | | After forced deterioration ($\eta$NOx %) | |
| --- | --- | --- | --- | --- |
| | 350° C. | 450° C. | 350° C. | 450° C. |
| 1A | 42 | 39 | 37 | 39 |
| 1B | 41 | 40 | 35 | 39 |
| 1C | 38 | 42 | 33 | 40 |
| 1D | 41 | 39 | 36 | 38 |
| 1E | 42 | 39 | 38 | 39 |
| 1F | 44 | 41 | 38 | 42 |
| 1G | 45 | 41 | 40 | 41 |
| 1H | 42 | 43 | 38 | 41 |
| 1I | 45 | 41 | 39 | 40 |
| 1J | 46 | 43 | 38 | 41 |
| 1K | 43 | 41 | 39 | 40 |
| 1L | 42 | 39 | 38 | 39 |
| 1M | 40 | 40 | 36 | 37 |
| 1N | 41 | 42 | 35 | 38 |
| 1O | 42 | 40 | 34 | 39 |
| 1P | 41 | 39 | 38 | 40 |
| 1Q | 43 | 41 | 36 | 39 |
| 1R | 28 | 29 | 28 | 29 |
| 1S | 31 | 31 | 30 | 28 |
| 1T | 45 | 40 | 35 | 40 |
| 1U | 44 | 39 | 39 | 40 |
| 1V | 46 | 41 | 36 | 39 |
| 1W | 45 | 40 | 35 | 39 |
| 1X | 43 | 39 | 36 | 38 |
| 1Y | 41 | 38 | 35 | 38 |
| 1Z | 41 | 38 | 8 | 18 |
| 1ZA | 42 | 39 | 7 | 17 |

EXAMPLE 4

Synthesis of alkaline earth metal-containing silicate 2A

A solution prepared by dissolving 5616 g of water glass #1 (contg. 30 wt % $SiO_2$) in 5429 g of water is referred to as solution 2A. Into 4175 g of water were dissolved 453.6 g of aluminum sulfate ($Al_2(SO_4)_3.17H_2O$), 94.6 g of ferric chloride ($FeCl_3.6H_2O$), 153.3 g of calcium chloride ($CaCl_2.6H_2O$), 262 g of sodium chloride, and 2020 g of concentrated hydrochloric acid. The resulting solution is designated as solution 2B. Solutions 2A and 2B were gradually mixed and sufficiently stirred to form a precipitate, thus preparing a slurry with pH 8.0. This slurry was charged into an autoclave and, with the addition of 500 g tetrapropylammonium bromide, the mixture was kept at 160° C. for 72 hours for crystallization. The crystalline product was filtered, rinsed, dried, and baked in air at 500° C. for 3 hours, and crystalline silicate 2A resulted.

Synthesis of alkaline earth metal-containing crystalline silicates 2B, 2C, and 2D The procedure for the synthesis of silicate 2A was repeated with the exception that calcium chloride (as $6H_2O$ salt) was replaced by 142.3 g of magnesium chloride (as $6H_2O$ salt), 186.6 g of strontium chloride (as $6H_2O$ salt), or 170.9 g of barium chloride (as $2H_2O$ salt) to obtain crystalline silicates 2B, 2C, and 2D, respectively.

Preparation of catalysts

With the addition of a binder, powders of crystalline silicates 2A to 2D were applied to cordierite monolithic substrates (meshed with 400 cells per square inch). The coated substrates were immersed in a 4M aqueous $NH_4Cl$ solution at 80° C. for 24 hours to effect $NH_4$ ion exchange. The ion exchange was followed by rinsing, drying, and baking at 500° C. for 3 hours to convert the coated crystalline silicates to proton type silicates.

The monolithic catalysts so obtained were then separately dipped separately in an aqueous hydrochloric acid solution of CuCl and aqueous solutions of $CoCl_2$, $NiCl_2$, $ZnCl_2$, $FeCl_3$, and $MnCl_2$. Excess liquid was wiped off from the substrate walls, and the catalysts were dried at 200° C. Purging in an $N_2$ atmosphere at 500° C. for 12 hours gave catalysts C1 to C28 as listed in Table 5 below. The quantity of each metal supported by the crystalline silicate was 0.8 mmol/g.

COMPARATIVE EXAMPLE 2

As a comparative example, crystalline silicate 2E was obtained by the same procedure for the synthesis of crystalline silicate 2A but without the addition of calcium chloride.

Then, catalysts R1 to R7 were prepared for comparison purposes are prepared using this crystalline silicate 2E in the same way as with the preparation of catalysts C1 to C28 with the supported metal listed in Table 5 below.

Also, divided portions of the monolithic substrate coated with silicate 2A were converted to the proton type in the manner described above and then were subjected to ion exchange separately with aqueous solutions of the chlorides of Ca, Mg, Sr, and Ba. After water rinsing, drying, and dipping in aqueous hydrochloric acid solution of CuCl in the same way as above, catalysts R8 to R11 were obtained as comparative examples.

EXPERIMENT 3

The monolithic catalysts prepared as above were tested for their catalytic performance before and after use in the treatment of a gas consisting of 10% $H_2O$ and the balance $N_2$ at 700° C. and at a GHSV of 30000 $Hr^{-1}$ for 24 hours. Their performance was determined under the following conditions.

Testing conditions
NO: 400 ppm
CO: 1000 ppm
$C_2H_4$: 1000 ppm
$C_3H_6$: 340 ppm
$O_2$: 8%
$CO_2$: 10%
$H_2O$: 10%
$N_2$: balance
GHSV: 30000 $hr^{-1}$ The denitration rates at 350° C. and 450° C. are given in Table 6.

TABLE 5

| | Catalysts prepared | | |
|---|---|---|---|
| Catalyst No. | Crystalline silicate | Alkaline earth metal in crystalline silicate | Metal supported |
| Example | | | |
| C1 | 2A | Ca | Cu |
| C2 | 2A | Ca | Co |
| C3 | 2A | Ca | Ni |
| C4 | 2A | Ca | Zn |
| C5 | 2A | Ca | Fe |
| C6 | 2A | Ca | Cr |
| C7 | 2A | Ca | Mn |
| C8 | 2B | Mg | Cu |
| C9 | 2B | Mg | Co |
| C10 | 2B | Mg | Ni |
| C11 | 2B | Mg | Zn |
| C12 | 2B | Mg | Fe |
| C13 | 2B | Mg | Cr |
| C14 | 2B | Mg | Mn |
| C15 | 2C | Sr | Cu |
| C16 | 2C | Sr | Co |
| C17 | 2C | Sr | Ni |
| C18 | 2C | Sr | Zn |
| C19 | 2C | Sr | Fe |
| C20 | 2C | Sr | Cr |
| C21 | 2C | Sr | Mn |
| C22 | 2D | Ba | Cu |
| C23 | 2D | Ba | Co |
| C24 | 2D | Ba | Ni |
| C25 | 2D | Ba | Zn |
| C26 | 2D | Ba | Fe |
| C27 | 2D | Ba | Cr |
| C28 | 2D | Ba | Mn |
| Comparative Example | | | |
| R1 | 2E | None | Cu |
| R2 | 2E | " | Co |
| R3 | 2E | " | Ni |
| R4 | 2E | " | Zn |
| R5 | 2E | " | Fe |
| R6 | 2E | " | Cr |
| R7 | 2E | " | Mn |
| R8 | 2E | " | Cu + Ca |
| R9 | 2E | " | Cu + Mg |
| R10 | 2E | " | Cu + Sr |
| R11 | 2E | " | Cu + Ba |

TABLE 6

| | Denitration rate (%) | | | |
|---|---|---|---|---|
| | Before treatment | | After treatment | |
| Catalyst No. | 350° C. | 400° C. | 350° C. | 400° C. |
| C1 | 41 | 40 | 37 | 40 |

TABLE 6-continued

| Catalyst No. | Denitration rate (%) | | | |
|---|---|---|---|---|
| | Before treatment | | After treatment | |
| | 350° C. | 400° C. | 350° C. | 400° C. |
| C2  | 47 | 41 | 42 | 41 |
| C3  | 47 | 39 | 42 | 39 |
| C4  | 32 | 40 | 29 | 40 |
| C5  | 30 | 29 | 29 | 29 |
| C6  | 28 | 25 | 25 | 25 |
| C7  | 25 | 33 | 21 | 33 |
| C8  | 40 | 39 | 36 | 40 |
| C9  | 46 | 40 | 42 | 39 |
| C10 | 45 | 40 | 41 | 41 |
| C11 | 33 | 41 | 30 | 41 |
| C12 | 30 | 28 | 28 | 28 |
| C13 | 29 | 24 | 26 | 24 |
| C14 | 24 | 34 | 21 | 34 |
| C15 | 40 | 42 | 37 | 42 |
| C16 | 46 | 40 | 41 | 40 |
| C17 | 45 | 41 | 40 | 40 |
| C18 | 33 | 41 | 30 | 41 |
| C19 | 31 | 29 | 27 | 28 |
| C20 | 29 | 25 | 25 | 25 |
| C21 | 23 | 32 | 21 | 31 |
| C22 | 39 | 40 | 35 | 40 |
| C23 | 47 | 41 | 42 | 41 |
| C24 | 46 | 40 | 41 | 40 |
| C25 | 32 | 40 | 30 | 41 |
| C26 | 29 | 27 | 26 | 28 |
| C27 | 28 | 24 | 26 | 24 |
| C28 | 24 | 31 | 23 | 30 |
| R1  | 41 | 39 | 10 | 20 |
| R2  | 46 | 40 | 8  | 20 |
| R3  | 46 | 41 | 9  | 21 |
| R4  | 33 | 39 | 11 | 19 |
| R5  | 30 | 29 | 9  | 15 |
| R6  | 27 | 24 | 8  | 12 |
| R7  | 23 | 31 | 10 | 18 |
| R8  | 38 | 41 | 12 | 23 |
| R9  | 39 | 40 | 10 | 22 |
| R10 | 40 | 41 | 7  | 19 |
| R11 | 38 | 39 | 10 | 20 |

Catalysts C1 to C28 according to the second aspect of the present invention were found to be clearly superior to comparative catalysts R1 to R11 in denitration after the treatment of a gaseous mixture with 10% $H_2O$ at 700° C., and it is now obvious that the catalysts of the second aspect of the invention is excellently durable and useful as a catalyst for the treatment of exhaust gases.

The third aspect of the present invention will now be described in detail by way of Examples 5 to 8 and Comparative Example 3.

EXAMPLE 5

Synthesis of mother crystal 3A

A solution of 5616 g of water glass #1 (contg. 30% $SiO_2$) in 5429 g of water is prepared and referred to as solution 3A. Meanwhile 718.9 g of aluminum sulfate, 110 g of ferric chloride, 262 g of sodium chloride, and 2020 g of concentrated hydrochloric acid are dissolved in 4175 g of water, and the solution is designated as solution 3B. Solutions 3A and 3B are fed at a predetermined ratio, and the mixture is caused to precipitate. Thorough agitation yields a slurry of pH 8.0.

This slurry is charged into a 20-liter autoclave and, with the addition of 500 g of tetrapropylammonium bromide, the mixture is subjected to hydrothermal synthesis at 160° C. for 72 hours. The synthesis is followed by water rinsing, drying, and baking at 500° C. for 3 hours to obtain crystalline silicate 3A. This crystalline silicate is represented, in terms of the molar ratio of the oxides (excluding crystal water), by the compositional formula:

$$0.5Na_2O \cdot 0.5H_2O \cdot [0.8Al_2O_3 \cdot 0.2Fe_2O_3] \cdot 25SiO_2$$

and has a crystal structure according to an X-ray diffraction analysis as shown in Table 1 above.

Synthesis of composite crystalline silicate A

One thousand grams of mother crystal A (crystalline silicate A) in a finely powdered state is added to 2160 g of water. With the further addition of 4590 g of colloidal silica (contg. 20% $SiO_2$), the mixture is thoroughly stirred, and the resulting solution is designated solution 3a. In the meantime 105.8 g of sodium hydroxide is dissolved in 2008 g of water to prepare solution 3b. While solution 3a is kept under agitation, solution 3b is slowly added drop-wise into solution 3a to form a precipitate and obtain a slurry.

This slurry is placed in an autoclave and a solution of 568 g tetrapropylammonium bromide in 2106 g of water is added. Inside the autoclave hydrothermal synthesis is carried out at 160° C. for 72 hours (with stirring at 200 rpm). After the stirring, the synthesis product is rinsed, dried, and baked at 500° C. for 3 hours to yield composite crystalline silicate 3A.

Preparation of catalysts

The composite crystalline silicate 3A was subjected to copper ion exchange by immersion in a 0.04M aqueous copper acetate solution at 30° C. with stirring. After 24-hour stirring, it was rinsed, and this cycle was repeated to conduct the copper ion exchange with the aqueous solution three times. Final rinsing and drying gave powder catalyst 3a.

To 100 parts of powder catalyst 3a added as binders were 3 parts of alumina sol, 55 parts of silica sol (contg. 20% $SiO_2$), and 200 parts of water. The mixture on thorough stirring afforded a slurry for wash coating. A monolithic substrate (with a 400-cell lattice pattern) for cordierite was dipped in the slurry and taken out, excess slurry was blown away, and then dried at 200° C. The coating so supported weighed 200 g per liter of the substrate, and this coated matter is designated as honeycomb catalyst 3A.

EXAMPLE 6

Mother crystals 3B to 3L were prepared by repeating the procedure for the synthesis of the mother crystal 3A in Example 5 with the exception that the ferric chloride was replaced by the chlorides of cobalt, ruthenium, rhodium, lanthanum, cerium, titanium, vanadium, chromium, antimony, gallium, or niobium, respectively, each in the same molar amount as $Fe_2O_3$ in terms of equivalency as oxide. The compositions of these mother crystals are represented, as the molar ratio of the oxides (in the dehydrated state), by the formula:

$$0.5Na_2O \cdot 0.5H_2O \cdot (0.2M_2O_3 \cdot 0.8Al_2O_3) \cdot 25SiO_2,$$

wherein M is Co, Ru, Rh, La, Ce, Ti, V, Cr, Sb, Ga, or Nb, constituting mother crystals 3B to 3L, respectively.

In the same manner as with mother crystal 3A but without the addition of the ferric chloride, mother crystal 3M was obtained.

These mother crystals 3B to 3M were finely powdered and used in place of mother crystal 3A in the synthesis of the crystalline silicate in Example 5. Repeated runs of hydrothermal synthesis using the autoclave gave laminar composite crystalline silicates 3B to 3M.

Using these crystalline silicates 3B to 3M, the procedure of Example 5 for the preparation of a catalyst was repeated, and powder catalysts 3b to 3m were obtained. These powder catalysts were used to coat monolithic substrates of cordierite, in the same way as in the preparation of catalyst in Example 5, and honeycomb catalysts 3B to 3M were obtained.

EXAMPLE 7

Divided portions of composite crystalline silicate 3A obtained in Example 5 were immersed with agitation in 0.04M aqueous solutions of cupric chloride, cobalt chloride, nickel chloride, ferric chloride, and silver nitrate at 60° C. for ion exchange with the respective metals. Then, in the same way as described in Example 5, powder catalysts 3n to 3r were prepared.

These powder catalysts were supported by monolithic substrates in the manner described in Example 5, and honeycomb catalysts 3N to 3R were obtained.

EXAMPLE 8

Composite crystalline silicate A prepared in Example 5 was immersed in a 4N aqueous $NH_4Cl$ solution at 80° C. and was stirred for 24 hours for $NH_4$ ion exchange. Following the ion exchange, the product was rinsed, dried at 100° C. for 24 hours, and baked at 500° C. for 3 hours to give H type crystalline silicate 3A. With the addition of a binder, this silicate 3A was applied to a cordierite type monolithic substrate as a coating.

Divided portions of the coated monolithic substrate were separately immersed for impregnation over a one-hour period in a cuprous chloride solution in hydrochloric acid (26.8 g in 200 $cm^3$ of HCl), aqueous cupric chloride solution (46.1 g in 200 $cm^3$ of water), aqueous cobalt chloride solution (64.4 g in 200 $cm^3$ of water), aqueous nickel chloride solution (64.4 g in 200 $cm^3$ of water), aqueous solution mixture of cupric chloride and cobalt chloride (23.1 g $CuCl_2.2H_2O$ and 32.2 g $CoCl_2.6H_2O$ in 200 $cm^3$ of water), and aqueous solution mixture of nickel chloride and cobalt chloride (32.2 g $NiCl_2.2H_2O$ and 32.2 g $CoCl_2.6H_2O$ in 200 $cm^3$ of water), respectively. The solutions left on the walls of the substrates were wiped off, and the coated substrates dried at 200° C. A 12-hour purging in a nitrogen atmosphere at 500° C. gave honeycomb catalysts 3S to 3X.

COMPARATIVE EXAMPLE 3

Mother crystal 3M obtained in Example 6 was directly subjected to Cu ion exchange in the same manner as with the preparation of catalyst in Example 5 to obtain powder catalyst 3m'. Likewise a monolithic substrate was coated with it to yield honeycomb catalyst 3Y.

EXPERIMENT 4

Honeycomb catalysts 3A to 3Y prepared in Examples 5 to 8 and in Comparative Example 3 were tested for the evaluation of their activities. The conditions for activity evaluation were as follows.

Gas composition

NO=400 ppm; CO=1000 ppm; $C_2H_4$=1000 ppm; $C_3H_6$=340 ppm; $O_2$=8%; $CO_2$=10%; $H_2O$=10%; the remainder=$N_2$; (144 cells).

The denitration rates of the catalysts in the initial state at reaction temperatures of 350° C. and 450° C. are given in Table 8.

EXPERIMENT 5

As a durability test the catalysts were forced to deteriorate with the supply of a gaseous mixture consisting of 10% $H_2O$ and the balance $N_2$ gas at a GHSV of 30000 $hr^{-1}$ for 24 hours.

The forcibly deteriorated honeycomb catalysts 3A to 3Y were evaluated for their activities under the same conditions as used in Experiment 4. The results are also shown in Table 8.

As Table 8 indicates, honeycomb catalysts 3A to 3X prepared using composite crystalline silicates had high denitration activities after the forced deterioration as well as in the initial state, proving that they were durable. The table also shows that the ordinary silicate catalyst (honeycomb catalyst 3Y) lost much of its activity after the forced deterioration, revealing that it was less durable.

TABLE 7

| Honeycomb catalyst No. | Powder catalyst | | Composite crystalline silicate | |
|---|---|---|---|---|
| | No. | Qty of active substance supported (mmol/g) | No. | Composition* |
| 3A | 3a | Cu(0.45) | 3A | $S.L./0.5Na_2O.0.5H_2O(0.2Fe_2O_3.0.8Al_2O_3)$ |
| 3B | 3b | Cu(0.40) | 3B | $S.L./0.5Na_2O.0.5H_2O(0.2Co_2O_3.0.8Al_2O_3)$ |
| 3C | 3c | Cu(0.35) | 3C | $S.L./0.4Na_2O.0.5H_2O(0.2Ru_2O_3.0.8Al_2O_3)$ |
| 3D | 3d | Cu(0.40) | 3D | $S.L./0.5Na_2O.0.4H_2O(0.2Rh_2O_3.0.8Al_2O_3)$ |
| 3E | 3e | Cu(0.45) | 3E | $S.L./0.5Na_2O.0.5H_2O(0.2La_2O_3.0.8Al_2O_3)$ |
| 3F | 3f | Cu(0.40) | 3F | $S.L./0.6Na_2O.0.4H_2O(0.2Ce_2O_3.0.8Al_2O_3)$ |
| 3G | 3g | Cu(0.45) | 3G | $S.L./0.5Na_2O.0.6H_2O(0.2Ti_2O_3.0.8Al_2O_3)$ |
| 3H | 3h | Cu(0.35) | 3H | $S.L./0.4Na_2O.0.6H_2O(0.2V_2O_3.0.8Al_2O_3)$ |
| 3I | 3i | Cu(0.40) | 3I | $S.L./0.5Na_2O.0.6H_2O(0.2Cr_2O_3.0.8Al_2O_3)$ |
| 3J | 3j | Cu(0.45) | 3J | $S.L./0.6Na_2O.0.4H_2O(0.2Sb_2O_3.0.8Al_2O_3)$ |
| 3K | 3k | Cu(0.40) | 3K | $S.L./0.6Na_2O.0.5H_2O(0.2Ga_2O_3.0.8Al_2O_3)$ |
| 3L | 3l | Cu(0.50) | 3L | $S.L./0.5Na_2O.0.5H_2O(0.2Nb_2O_3.0.8Al_2O_3)$ |
| 3M | 3m | Cu(0.40) | 3M | $S.L./0.4Na_2O.0.4H_2O.0.8Al_2O_3$ |
| 3N | 3n | Cu(0.40) | 3A | $S.L./0.5Na_2O.0.4H_2O(0.2Fe_2O_3.0.8Al_2O_3)$ |
| 3O | 3o | Co(0.35) | 3A | " |
| 3P | 3p | Ni(0.30) | 3A | " |
| 3Q | 3q | Fe(0.30) | 3A | " |
| 3R | 3r | Ag(0.70) | 3A | " |
| 3S | — | CU(0.80) | 3A(H type) | $S.L./H_2O.(0.2Fe_2O_3.0.8Al_2O_3)$ |
| 3T | — | Cu(0.80) | 3A(H type) | " |
| 3U | — | Co(0.80) | 3A(H type) | " |
| 3V | — | Ni(0.40) | 3A(H type) | " |
| 3W | — | Cu(0.40) Co(0.40) | 3A (type) | " |

TABLE 7-continued

| Honeycomb catalyst No. | Powder catalyst | | Composite crystalline silicate | |
|---|---|---|---|---|
| | No. | Qty of active substance supported (mmol/g) | No. | Composition* |
| 3X | — | Ni(0.40) Co(0.40) | 3A (type) | " |
| 3Y | m' | Cu(0.40) | | 0.4Na$_2$O.0.8Al$_2$O$_3$ (without S.L) |

*In the composition, the symbol S.L stands for silicalite, and 25SiO$_2$ is omitted because it is common to all the compositions.

TABLE 8

| Honey-comb cata-lyst No. | Powder catalyst | | Initial activity ($\eta$NOx %) | | Activity after forced deterioration ($\eta$NOx %) | |
|---|---|---|---|---|---|---|
| | No. | Qty of active substance supported (mmol/g) | 350° C. | 450° C. | 350° C. | 450° C. |
| 3A | 3a | Cu(0.45) | 41 | 40 | 38 | 36 |
| 3B | 3b | Cu(0.40) | 39 | 38 | 37 | 35 |
| 3C | 3c | Cu(0.35) | 40 | 41 | 37 | 36 |
| 3D | 3d | Cu(0.40) | 38 | 40 | 38 | 35 |
| 3E | 3e | Cu(0.45) | 39 | 41 | 39 | 38 |
| 3F | 3f | Cu(0.40) | 37 | 40 | 35 | 35 |
| 3G | 3g | Cu(0.45) | 38 | 41 | 36 | 35 |
| 3H | 3h | Cu(0.35) | 37 | 38 | 36 | 35 |
| 3I | 3i | Cu(0.40) | 38 | 36 | 35 | 34 |
| 3J | 3j | Cu(0.45) | 37 | 40 | 36 | 33 |
| 3K | 3k | Cu(0.40) | 38 | 39 | 37 | 34 |
| 3L | 3l | Cu(0.50) | 38 | 41 | 36 | 37 |
| 3M | 3m | Cu(0.40) | 38 | 40 | 39 | 35 |
| 3N | 3n | Cu(0.40) | 38 | 36 | 34 | 33 |
| 3O | 3o | Co(0.35) | 38 | 40 | 36 | 35 |
| 3P | 3p | Ni(0.30) | 36 | 40 | 38 | 36 |
| 3Q | 3q | Fe(0.30) | 35 | 40 | 36 | 34 |
| 3R | 3r | Ag(0.70) | 36 | 38 | 35 | 33 |
| 3S | — | Cu(0.80) | 35 | 36 | 34 | 33 |
| 3T | — | Cu(0.80) | 36 | 35 | 33 | 32 |
| 3U | — | Co(0.80) | 36 | 38 | 32 | 33 |
| 3V | — | Ni(0.40) | 36 | 38 | 31 | 33 |
| 3W | — | Cu(0.40) Co(0.40) | 35 | 36 | 31 | 31 |
| 3X | — | Ni(0.40) Co(0.40) | 35 | 37 | 35 | 32 |
| 3Y | m' | Cu(0.40) | 40 | 41 | 10 | 13 |

With regard to the catalytic activities for the removal of CO and hydrocarbons, honeycomb catalysts 3A to 3X according to the third aspect of the invention underwent little changes in activity from the initial stage till after the forced deterioration. They showed 100% removal rates at both 350° C. and 450° C. Comparative honeycomb catalyst 3Y also had a CO and hydrocarbon purification activity of 100% initially at both 350° C. and 450° C. After the forced deterioration, however, the CO removal rates of comparative honeycomb catalyst 3Y at 350° C. and 450° C. declined to 35% and 75%, respectively, and the hydrocarbon removal rates at those temperatures also dropped to 45% and 90%.

The fourth aspect of the present invention will now be described in detail by way of Examples 9 to 12 and Comparative Example 4.

EXAMPLE 9

Synthesis of mother crystal 4A

A solution of 5616 g water glass #1 (contg. 30% SiO$_2$) in 5429 g of water is prepared and referred to as solution 4A. Meanwhile 718.9 g of aluminum sulfate, 110 g of ferric chloride, 47.2 g of calcium acetate, 262 g of sodium chloride, and 2020 g of concentrated hydrochloric acid are dissolved in 4175 g of water, and the solution is designated solution 4B. Solutions 4A and 4B are fed at a predetermined ratio, and the mixture is caused to precipitate. Thorough agitation yields a slurry of pH 8.0.

This slurry is charged into a 20-liter autoclave and, with the addition of 500 g of tetrapropylammonium bromide, the mixture is subjected to hydrothermal synthesis at 160° C. for 72 hours. The synthesis is followed by water rinsing, drying, and baking at 500° C. for 3 hours to obtain crystalline silicate 4A. This crystalline silicate is represented, in terms of the molar ratio of the oxides (excluding crystal water), by the compositional formula:

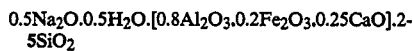

$$0.5Na_2O.0.5H_2O.[0.8Al_2O_3.0.2Fe_2O_3.0.25CaO].25SiO_2$$

and has a crystal structure according to an X-ray diffraction analysis as shown in Table 1 above.

Synthesis of composite crystalline silicate 4A

One thousand grams of the mother crystal 4A (crystalline silicate 4A) in a finely powdered state is added to 2160 g of water. With the further addition of 4590 g of colloidal silica (contg. 20% SiO$_2$), the mixture is thoroughly stirred, and the resulting solution is designated as solution 4a. In the meantime 105.8 g of sodium hydroxide is dissolved in 2008 g of water to prepare solution 4b. While solution 4a is kept under agitation, solution 4b is slowly added drop-wise into solution 4a to form a precipitate and obtain a slurry.

This slurry is placed in an autoclave and a solution of 568 g of tetrapropylammonium bromide in 2106 g of water is added. Inside the autoclave hydrothermal synthesis is carried out at 160° C. for 72 hours (with stirring at 200 rpm). After the stirring, the synthesis product is rinsed, dried, and baked at 500° C. for 3 hours to yield laminar composite crystalline silicate 4A.

Preparation of catalysts

Composite crystalline silicate 4A was subjected to copper ion exchange by immersion in a 0.04M aqueous copper acetate solution at 30° C. with stirring. After 24-hour stirring, it was rinsed, and this cycle was repeated to conduct the copper ion exchange with the aqueous solution Three times. Final rinsing and drying gave powder catalyst 4a.

To 100 parts of powder catalyst 4a added as binders were 3 parts of alumina sol, 55 parts silica sol (contg. 20% SiO$_2$), and 200 parts water. The mixture upon thorough stirring afforded a slurry for wash coating. A monolithic substrate (with a 400-cell lattice pattern) for cordierite was dipped in the slurry and taken out, excess slurry was blown away, and then dried at 200° C. The coating so supported weighed 200 g per liter of the substrate, and this coated matter is designated as honeycomb catalyst 4A.

EXAMPLE 10

Mother crystals 4B to 4L were prepared by repeating the procedure for the synthesis of mother crystal 4A in Example 9 with the exception that the ferric chloride was replaced by the chlorides of cobalt, ruthenium, rhodium, lanthanum, cerium, titanium, vanadium, chromium, antimony, gallium, and niobium, respectively, each in the same molar amount as Fe$_2$O$_3$ in terms of equivalency as oxide. The compositions of these mother crystals are represented, as the molar ratio of the oxides (in the dehydrated state), by the formula:

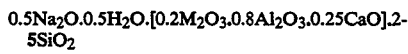

0.5Na$_2$O.0.5H$_2$O.[0.2M$_2$O$_3$.0.8Al$_2$O$_3$.0.25CaO].2-5SiO$_2$ wherein M is Co, Ru, Rh, La, Ce, Ti, V, Cr, Sb, Ga, or Nb, constituting mother crystals 4B to 4L, respectively.

In the same manner as with mother crystal 4A but without the addition of the ferric chloride and calcium acetate, mother crystal 4M was obtained.

These mother crystals 4B to 4M were finely powdered and used in place of mother crystal 4A in the synthesis of the crystalline silicate in Example 9. Repeated runs of hydrothermal synthesis using the autoclave gave composite crystalline silicates 4B to 4M.

Using these crystalline silicates 4B to 4M, the procedure of Example 9 for the preparation of a catalyst was repeated, and powder catalysts 4b to 4m were obtained. These powder catalysts were used to coat monolithic substrates of cordierite, in the same way as in the preparation of catalyst in Example 9, and honeycomb catalysts 4B to 4M were obtained.

EXAMPLE 11

In the synthesis of mother crystal 4A in Example 9 calcium acetate was replaced by magnesium acetate, strontium acetate, or barium acetate, each in the same molar amount as CaO in terms of equivalency as oxide, and otherwise the same procedure with the mother crystal 4A was repeated to prepare mother crystals 4N to 4P. The compositions of these mother crystals, in terms of the molar ratio of the oxides (in a dehydrated state) were represented by:

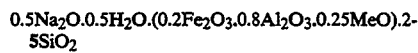

0.5Na$_2$O.0.5H$_2$O.(0.2Fe$_2$O$_3$.0.8Al$_2$O$_3$.0.25MeO).2-5SiO$_2$ wherein Me is Mg, Sr, or Ba. These mother crystals were finely ground and were subjected to hydrothermal synthesis using the autoclave in the same manner as with the synthesis of the crystalline silicates in Example 9 to obtain crystalline silicates 4N to 4P. From these silicates 4N to 4P, powder catalysts 4n to 4p and then honeycomb catalysts 4N to 4P were obtained by following the procedure of Example 9.

EXAMPLE 12

Divided portions of composite crystalline silicate 4A obtained in Example 9 were immersed with agitation in 0.04M aqueous solutions of cupric chloride, cobalt chloride, nickel chloride, ferric chloride, and silver nitrate at 60° C. for ion exchange with the respective metals. Then, in the same way as described in Example 9, powder catalysts 4q to 4u were prepared.

These powder catalysts were supported by monolithic substrates in the manner described in Example 9, and honeycomb catalysts 4Q to 4U were obtained.

EXAMPLE 13

The crystalline silicate 4A prepared in Example 9 was immersed in a 4N aqueous NH$_4$Cl solution at 80° C. and was stirred for 24 hours for NH$_4$ ion exchange. Following the ion exchange, the product was rinsed, dried at 100° C. for 24 hours, and baked at 500° C. for 3 hours to give H type crystalline silicate 4A'. With the addition of binder, this silicate 4A' was applied to a cordierite type monolithic substrate as a coating.

Divided portions of the coated monolithic substrate were separately immersed for impregnation over a one-hour period in a solution of cuprous chloride in hydrochloric acid (26.8 g in 200 cm$^3$ of HCl), aqueous cupric chloride solution (46.1 g in 200 cm$^3$ of water), aqueous cobalt chloride solution (64.4 g in 200 cm$^3$ of water), aqueous nickel chloride (64.4 g in 200 cm$^3$ of water), aqueous solution mixture of cupric chloride and cobalt chloride (23.1 g CuCl$_2$.2H$_2$O and 32.2 g CoCl$_2$.6H$_2$O in 200 cm$^3$ of water), and aqueous solution mixture of nickel chloride and cobalt chloride (32.2 g NiCl$_2$.2H$_2$O and 32.2g CoCl$_2$.6H$_2$O in 200 cm$^3$ of water), respectively. The solutions left on the walls of the substrates were wiped off, and the coated substrates dried at 200° C. A 12-hour purging in a nitrogen atmosphere at 500° C. gave honeycomb catalysts 4V to 4α.

COMPARATIVE EXAMPLE 4

Mother crystal 4M obtained in Example 10 was directly subjected to Cu ion exchange in the same manner as with the preparation of catalyst in Example 9 to obtain powder catalyst 4m'. Likewise a monolithic substrate was coated with it to yield honeycomb catalyst 4β.

EXPERIMENT 6

Honeycomb catalysts 4A to 4β prepared in Examples 9 to 13 and in Comparative Example 4 were tested for the evaluation of their activities. The conditions for activity evaluation were as follows.

Gas composition

NO=400 ppm; CO=1000 ppm; C$_2$H$_4$=1000 ppm; C$_3$H$_6$=340 ppm; O$_2$=8%; CO$_2$=10%; H$_2$O=10%; the remainder=N$_2$; GHSV=30000 hr$^{-1}$; catalyst shape=15 mm×15 mm×60 mm (144 cells).

The denitration rates of the catalysts in the initial state at reaction temperatures of 350° C. and 450° C. are given in Table 10.

EXPERIMENT 7

As a durability test the catalysts were forced to deteriorate with the supply of a gaseous mixture consisting of 10% H$_2$O and the balance N$_2$ gas at a GHSV of 30000 hr$^{-1}$ for 24 hours. The forcibly deteriorated honeycomb catalysts 4A to 4β were evaluated for their activities under the same conditions as used in Experiment 6. The results are also shown in Table 10.

As Table 10 indicates, the honeycomb catalysts 4A to 4α prepared using composite crystalline silicates according to the fourth aspect of the invention had high denitration activities after the forced deterioration as well as in the initial state, proving that they were durable. The table also shows that the ordinary silicate catalyst (honeycomb catalyst 4β) lost much of its activity after the forced deterioration, revealing that it was less durable.

TABLE 9

| Honeycomb catalyst No. | Powder catalyst No. | Qty of active substance supported (mmol/g) | Composite crystalline silicate No. | Composition* |
|---|---|---|---|---|
| A | a | Cu(0.45) | A | $S.L/0.5Na_2O.0.5H_2O(0.2Fe_2O_3.0.8Al_2O_3.0.25CaO)$ |
| B | b | Cu(0.40) | B | $S.L/0.5Na_2O.0.5H_2O(0.2Co_2O_3.0.8Al_2O_3.0.25CaO)$ |
| C | c | Cu(0.35) | C | $S.L/0.4Na_2O.0.5H_2O(0.2Ru_2O_3.0.8Al_2O_3.0.25CaO)$ |
| D | d | Cu(0.40) | D | $S.L/0.5Na_2O.0.4H_2O(0.2Rh_2O_3.0.8Al_2O_3.0.25CaO)$ |
| E | e | Cu(0.45) | E | $S.L/0.5Na_2O.0.5H_2O(0.2La_2O_3.0.8Al_2O_3.0.25CaO)$ |
| F | f | Cu(0.40) | F | $S.L/0.6Na_2O.0.4H_2O(0.2Ce_2O_3.0.8Al_2O_3.0.25CaO)$ |
| G | g | Cu(0.45) | G | $S.L/0.5Na_2O.0.6H_2O(0.2Ti_2O_3.0.8Al_2O_3.0.25CaO)$ |
| H | h | Cu(0.35) | H | $S.L/0.4Na_2O.0.6H_2O(0.2V_2O_3.0.8Al_2O_3.0.25CaO)$ |
| I | i | Cu(0.40) | I | $S.L/0.5Na_2O.0.6H_2O(0.2Cr_2O_3.0.8Al_2O_3.0.25CaO)$ |
| J | j | Cu(0.45) | J | $S.L/0.6Na_2O.0.4H_2O(0.2Sb_2O_3.0.8Al_2O_3.0.25CaO)$ |
| K | k | Cu(0.40) | K | $S.L/0.6Na_2O.0.5H_2O(0.2Ga_2O_3.0.8Al_2O_3.0.25CaO)$ |
| L | l | Cu(0.50) | L | $S.L/0.5Na_2O.0.5H_2O(0.2Nb_2O_3.0.8Al_2O_3.0.25CaO)$ |
| M | m | Cu(0.40) | M | $S.L/0.4Na_2O.0.4H_2O.0.8Al_2O_3$ |
| N | n | Cu(0.45) | N | $S.L/0.5Na_2O.0.5H_2O(0.2Fe_2O_3.0.8Al_2O_3.0.25MgO)$ |
| O | o | Cu(0.45) | O | $S.L/0.5Na_2O.0.5H_2O(0.2Fe_2O_3.0.8Al_2O_3.0.25SrO)$ |
| P | p | Cu(0.45) | P | $S.L/0.5Na_2O.0.5H_2O(0.2Fe_2O_3.0.8Al_2O_3.0.25BaO)$ |
| Q | q | Cu(0.40) | A | $S.L/0.5Na_2O.0.5H_2O(0.2Fe_2O_3.0.8Al_2O_3.0.25CaO)$ |
| R | r | Co(0.35) | A | " |
| S | s | Ni(0.30) | A | " |
| T | t | Fe(0.30) | A | " |
| U | u | Ag(0.70) | A | " |
| V | | Cu(0.80) | A'(H type) | $S.L/H_2O.(0.2Fe_2O_3.0.8Al_2O_3.0.25CaO)$ |
| W | | Cu(0.80) | A'(H type) | " |
| X | | Co(0.80) | A'(H type) | " |
| Y | | Ni(0.40) | A'(H type) | " |
| Z | | Cu(0.40) Co(0.40) | A'(H type) | " |
| α | | Ni(0.40) Co(0.40) | A'(H type) | " |
| β | m' | Cu(0.40) | | $0.4Na_2O.0.8Al_2O_3$ (without S.L) |

In the composition, the symbol S.L stands for silicalite, and $25SiO_2$ is omitted because it is common to all the compositions.

TABLE 10

| Honeycomb catalyst No. | Powder catalyst No. | Qty of active substance supported (mmol/g) | Initial activity ($\eta NOx$ %) 350° C. | Initial activity ($\eta NOx$ %) 450° C. | Activity after forced deterioration ($\eta NOx$ %) 350° C. | Activity after forced deterioration ($\eta NOx$ %) 450° C. |
|---|---|---|---|---|---|---|
| A | a | Cu(0.45) | 40 | 40 | 39 | 36 |
| B | b | Cu(0.40) | 39 | 39 | 37 | 34 |
| C | c | Cu(0.35) | 41 | 41 | 38 | 36 |
| D | d | Cu(0.40) | 38 | 38 | 38 | 34 |
| E | e | Cu(0.45) | 38 | 41 | 37 | 38 |
| F | f | Cu(0.40) | 37 | 40 | 35 | 36 |
| G | g | Cu(0.45) | 38 | 42 | 35 | 35 |
| H | h | Cu(0.35) | 38 | 38 | 36 | 34 |
| I | i | Cu(0.40) | 38 | 35 | 35 | 34 |
| J | j | Cu(0.45) | 37 | 40 | 35 | 32 |
| K | k | Cu(.040) | 37 | 39 | 37 | 34 |
| L | l | Cu(0.50) | 38 | 37 | 37 | 36 |
| M | m | Cu(0.40) | 39 | 40 | 39 | 37 |
| N | n | Cu(0.45) | 39 | 36 | 38 | 36 |
| O | o | Cu(0.45) | 40 | 37 | 36 | 35 |
| P | p | Cu(0.45) | 41 | 40 | 37 | 34 |
| Q | q | Cu(0.40) | 39 | 36 | 35 | 33 |
| R | r | Cu(0.35) | 39 | 40 | 36 | 36 |
| S | s | Ni(0.30) | 36 | 39 | 37 | 36 |
| T | t | Fe(0.30) | 36 | 40 | 37 | 36 |
| U | u | Ag(0.70) | 36 | 39 | 35 | 33 |
| V | — | Cu(0.80) | 36 | 36 | 35 | 33 |
| W | — | Cu(0.80) | 36 | 38 | 33 | 34 |
| X | — | Co(0.80) | 35 | 38 | 33 | 33 |
| Y | — | Ni(0.40) | 36 | 39 | 31 | 32 |
| Z | — | Cu(0.40) Co(0.40) | 36 | 36 | 33 | 31 |
| α | — | Ni(0.40) Co(0.40) | 35 | 38 | 35 | 31 |
| β | m' | Cu(0.40) | 39 | 42 | 6 | 12 |

We claim:

1. In a catalyst for exhaust gas purification wherein a crystalline silicate has strongly acidic sites which promote removal of metal in the presence of high-temperature steam, the improvement comprising:
a crystalline silicate having in a dehydrated state a chemical formula, in terms of the molar ratio of oxides, $$aR_2O.bMO.Al_2O_3cSiO_2$$

where R is selected from the group consisting of an alkali metal ion, a hydrogen ion, and a mixture thereof, M is at least one alkaline earth metal selected from the group consisting of Ca, Mg, Sr, and Ba, a=0–2, b=0.03–40, providing that a+b>1 and c=11–3000;
said silicate having an X-ray diffraction pattern described in the following X-ray diffraction table

| Lattice spacing (d value) | Relative intensity |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M | where,
VS = Very Strong
S = Strong
M = Moderate
W = Weak; and said crystalline silicate containing at least one metal selected from the group consisting of elements in Groups Ib and VIII of the periodic table;

said at least one alkaline earth metal being within the crystalline lattice of said crystalline silicate so that the strongly acidic sites in the crystalline silicate are reduced and demetallization in the presence of high-temperature steam in use is inhibited whereby durability of the catalyst is improved while maintaining catalytic activities.

2. In a catalyst for purifying exhaust gases containing nitrogen oxides, hydrocarbons, and carbon monoxide, wherein a crystalline silicate has strongly acidic sites which promote removal of metal in the presence of high-temperature steam, the improvement comprising:

a crystalline silicate having in a dehydrated state a chemical formula, $$(1 \pm 0.4)R_2O \cdot [aM_2O_3 \cdot bAl_2O_3] \cdot cMeO \cdot ySiO_2$$

where R is selected from the group consisting of an alkali metal ion, a hydrogen ion, and a mixture thereof, M is at least one element selected from the group consisting of elements in Group VIII of the periodic table, rare earth elements, titanium, vanadium, chromium, niobium, and antimony, Me is an alkaline earth element, $a+b=1.0$, $a>0$, $b>0$, $y/c>12$, and $y>12$; and said crystalline silicate containing at least one metal selected from the group consisting of Zn, Mn, Cr, and the elements in Groups Ib and VIII of the periodic table;

said at least one alkaline earth metal being within the crystalline lattice of said crystalline silicate so that the strongly acidic sites in the crystalline silicate are reduced and demetallization in the presence of high-temperature steam in use in inhibited whereby durability of the catalyst is improved while maintaining catalytic activities.

3. In a catalyst for exhaust gas purification and wherein a crystalline silicate has active reaction sites and the presence of high-temperature $H_2O$ tends to cause metals to separate from the silicate, the improvement comprising:

a composite crystalline silicate having an X-ray diffraction pattern described

| Lattice spacing (d value) | Relative intensity |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

VS: Very Strong
S: Strong
M: Moderate
W: Weak said composite crystalline silicate being formed by growing a crystalline silicate having Si and O components over a previously synthesized mother crystal of a crystalline silicate;

said mother crystal having in a dehydrated state and in terms of the molar ratio of oxides the chemical formula $$(1 \pm 0.6)R_2O \cdot [aM_2O_3 \cdot bAl_2O_3] \cdot ySiO_2$$

where R is selected from the group consisting of an alkali metal ion, a hydrogen ion, and a mixture thereof, M is an ion of at least one element selected from the group consisting of elements of Group VIII in the periodic table, rare earth elements, titanium, vanadium, chromium, niobium, antimony, and gallium, $a \leq 0$, $b \leq 0$, $a+b=1$, and $y>12$;

said mother crystal having an X-ray diffraction pattern described in said X-ray diffraction table so that said crystalline silicate grown over said mother crystal has the same crystalline structure as said mother crystal; and said composite crystalline silicate containing at least one metal selected from the group consisting of elements in Groups Ib and VIII of the periodic table;

said crystalline silicate grown over said mother crystal reducing permeation of $H_2O$ into said crystalline silicate so that $H_2O$ concentrations around said active reaction sites are reduced and demetallization in the presence of high-temperature $H_2O$ in use is inhibited whereby durability of the catalyst is improved while maintaining catalytic activities.

4. In a catalyst for exhaust gas purification wherein a crystalline silicate has strongly acidic sites which promote removal of metal in the presence of high-temperature steam, the improvement comprising:

a composite crystalline silicate having an X-ray diffraction pattern described in

| Lattice spacing (d value) | Relative intensity |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

VS: Very Strong
S: Strong
M: Moderate
W: Weak said composite crystalline silicate being formed by growing a crystalline silicate having Si and O components over a previously synthesized mother crystal of a crystalline silicate;

said mother crystal having in a dehydrated state and in terms of the molar ratio of oxides the chemical formula $$(1 \pm 0.6)R_2O \cdot [aM_2O_3 \cdot bAl_2O_3] \cdot cMeO \cdot ySiO_2$$

where R is selected from the group consisting of an alkali metal ion, a hydrogen ion, and a mixture thereof, M is at least one element selected from the group consisting of elements in Group VIII of the periodic table, rare earth elements, titanium, vanadium, chromium, niobium, antimony, and gallium, Me is an alkaline earth element, $a \leqq 0$, $b \leqq 0$, $c \leqq 0$, $a+b=1$, $y/c > 12$, and $y > 12$;

said mother crystal having an X-ray diffraction pattern described in said X-ray diffraction table so that said crystalline silicate grown over said mother crystal has the same crystalline structure as said mother crystal; and said composite crystalline silicate containing at least one metal selected from the group consisting of elements in Groups Ib and VIII of the periodic table;

said at least one alkaline earth metal being within the crystalline lattice of said crystalline silicate so that the strongly acidic sites in the crystalline silicate are reduced and demetallization in the presence of high-temperature steam in use is inhibited whereby durability of the catalyst is improved while maintaining catalytic activities.

* * * * *